Aug. 4, 1959 K. H. FOLSE 2,898,408

MAGNETIC DRUM ERASER

Filed May 9, 1955

INVENTOR
KENNETH H. FOLSE

BY W. R. Mattoy
Howard White
ATTORNEYS

United States Patent Office 2,898,408

Patented Aug. 4, 1959

2,898,408

MAGNETIC DRUM ERASER

Kenneth H. Folse, Washington, D.C.

Application May 9, 1955, Serial No. 507,189

3 Claims. (Cl. 179—100.2)

(Granted under Title 35, U.S. Code (1952), sec. 266)

The invention described herein may be manufactured and used by or for the Government of the United States of America for governmental purposes without the payment of any royalties thereon or therefor.

The present invention relates to a single channel magnetic drum eraser and more particularly to a LCR series resonant circuit which produces a damped sinusoidal wave train for erasing, by demagnetization, information stored on one track of a magnetic memory drum, a loop or magnetic belt or to any repetitive magnetic recording.

The practice in erasing magnetic memory drums before this invention has been to erase the entire drum surface using an A.-C. magnet operated from the power line (usually 60 cycles). This requires slowing or stopping the drum; otherwise, each section of the drum surface will receive the same flux, resulting in a polarized surface. Other methods have been used to erase magnetic recordings, such as high frequency erase systems and passing direct current through the recording head. These methods either require complex equipment or produce unsatisfactory erasure by leaving a magnetically polarized recording track or by introducing transient spikes in switching.

The present invention overcomes the above disadvantages for erasing a magnetic memory drum by providing a damped sinusoidal wave train having a period of oscillation long enough to correspond to several revolutions of the drum. The Q of the circuit, a measure of the rapidity of decay of the exponential waveform, of the circuit and the peak of the current are thus interrelated by the requirement that full saturation current be present during the second half cycle. In order to completely erase the drum, the period of the erase current must be greater than twice the speed of the drum so that every portion of the drum surface will receive the proper magnetizing force within a given half cycle of the erase current.

It is accordingly an object of the present invention to provide a simple, reliable device to correct the foregoing shortcomings of magnetic memory drum erasers.

A further object of the present invention is to provide a magnetic memory drum eraser employing a series LCR resonant circuit.

Another object of this invention is to leave the erased channel and record head with no magnetic bias, so that it may later be used to record signals of either polarity.

A still further object of this invention is to demagnetize the read-record head for test channels.

Still another object of this invention is to erase the information stored on one track of a magnetic memory drum without affecting information stored on other tracks of the drum and without affecting the clock and reset channels.

Yet another object of this invention is to provide a magnetic memory drum eraser that erases any one channel of a drum while the drum is operating at its normal operational speed to avoid stopping the drum.

A still further object of the present invention is to provide a device which is simple, inexpensive and independent of the normal equipment used during operation of a magnetic memory drum to avoid special equipment attached to the drum.

A final object of the present invention is to provide a simple magnetic memory drum eraser which is effective whether the magnetically stored information is digital or analogue.

Other and more specific objects of this invention will become apparent upon a careful consideration of the following detailed description when taken together with the accompanying drawings, in which.

Figures 1, 2, 3:
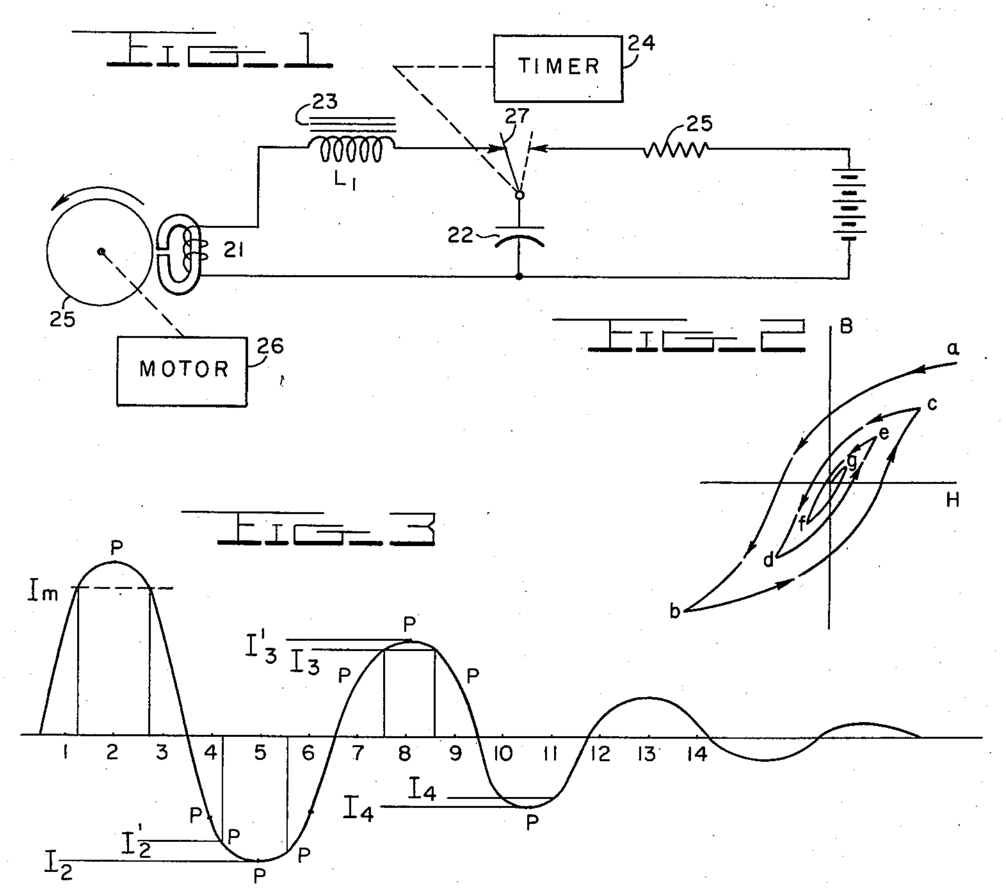
Fig. 1 is a simple schematic diagram of the circuit used in carrying out the invention.
Fig. 2 illustrates a BH curve of successive hysteresis loops in the record head during the operation of erasing the drum.
Fig. 3 illustrates the erase current plotted against a period of the rotation of the drum.

Referring now to Fig. 1 there is shown a schematic drawing of a typical erase circuit for use with a drum recorder such as shown in U.S. Patent No. 2,614,169. A series resonant circuit comprising a magnetic or record-playback head 21 for one track of a magnetic drum memory device, a 40 mf. condenser 22, a 5 henry-17 ohm inductance 23, a timer 24, a 2K2W resistor 25, an applied D.-C. voltage of 300 volts, and a single throw-double pole switch 27. The inductance of the head is usually insignificant compared with that of the inductor. The recording medium 28 and drive motor 26 are shown diagrammatically.

The elements of the circuit comprising this invention are made into a compact unit, excepting the head. The circuit is adapted to be connected with the record-playback head 21 for use with any one of the recording tracks of a magnetic drum memory device. As shown in Fig. 1 the switch 27 is normally in a position completing the series resonant circuit. After the head 21 has been included in the circuit, a control button which actuates switch 27 is thrown to start the timer and to connect the condenser 22 with the power supply through the current limiting resistor 25. The timer is set so that after the condenser is fully charged switch 27 is returned to its normal position. The LCR series resonant circuit is thus completed and the drum is erased by the damped sinusoidal wave train. The period of the erase current is long enough to assure that every portion on the drum surface receives the proper magnetizing force within a given half cycle of the erase current and is greater than twice the rotational period of the drum but not integrally related thereto. The current on the first cycle is sufficient to saturate both the head and the drum surface for one revolution to insure that any transients are erased and subsequent cycles of the demagnetizing current are high enough so that successive half wave cycles of the erase train are sufficient to change the polarity of the residual magnetism in order to completely erase the memory channel. A light is operated by the timer to indicate the decay time wave train when the drum is completely erased. The erase connector to the head is then removed.

The LCR series resonant circuit produces successive diminishing hysteresis loops in the record head during the period while the energy is stored in the inductor or capacitor. As shown in Fig. 2, each successive hysteresis loop represents a reversal in the magnetizing current and a decrease in the magnitude of the current with each reversal. The track of the memory drum that is being erased is demagnetized step by step as the current alternates and the magnitude of each cycle of alternating current decreases. It is to be noted that the requirements placed upon the magnetizing forces are (1) successive maximum values must alternate in polarity, (2) the absolute value of each force must be smaller than the preceding one, and (3) each successive value of the magnetizing force must be great enough to reverse the sign of the residual magnetism of the drum. From this it follows that the decay of the erasing current sine wave must not be excessively rapid, otherwise, reversal of the polarity of the residual magnetism will not occur.

It is necessary that each point of the drum surface on the track being erased be subjected to magnetizing forces *a, b, c, d,* etc., of Fig. 2 so that every point on the track receives magnetizing forces in excess of minimum forces required to erase the drum.

In Fig. 3 the erase current is plotted against rotational periods of the drum, considering one given point *p* on the circumference of the drum. On the first rotation of the drum opposite time 1 the magnetic state of *p* is undetermined; therefore, the condition of this point cannot be represented on the BH curve of Fig. 4. However, on the next revolution, 2, of the drum, its magnetizing force is greater than I*m*, hence, this elemental area of the drum has been saturated and after it has moved past the recording head it will go from 2 to *x* on the BH curve of Fig. 4. On the third revolution of the drum, positive magnetizing force is still present and this portion of the drum surface then goes out in the minor hysteresis loop to 3 and again back to *x*, Fig. 4. On the fourth rotation of the drum the magnetizing force is now reversed but is of such magnitude that although point *p* is now reversed in magnetizing force its residual magnetism is still positive as indicated by *y* on Fig. 4, the point going through the minor hysteresis loop *x*, 4, *y* as indicated by the arrows. On the fifth revolution, when point *p* passes under the recording head, the negative magnetizing force is again greater and the condition of point *p* is described by *y*, 4, 5, *z*. Thus the first half cycle of the demagnetization has taken place in accordance with the principle set forth above.

Figure 4:
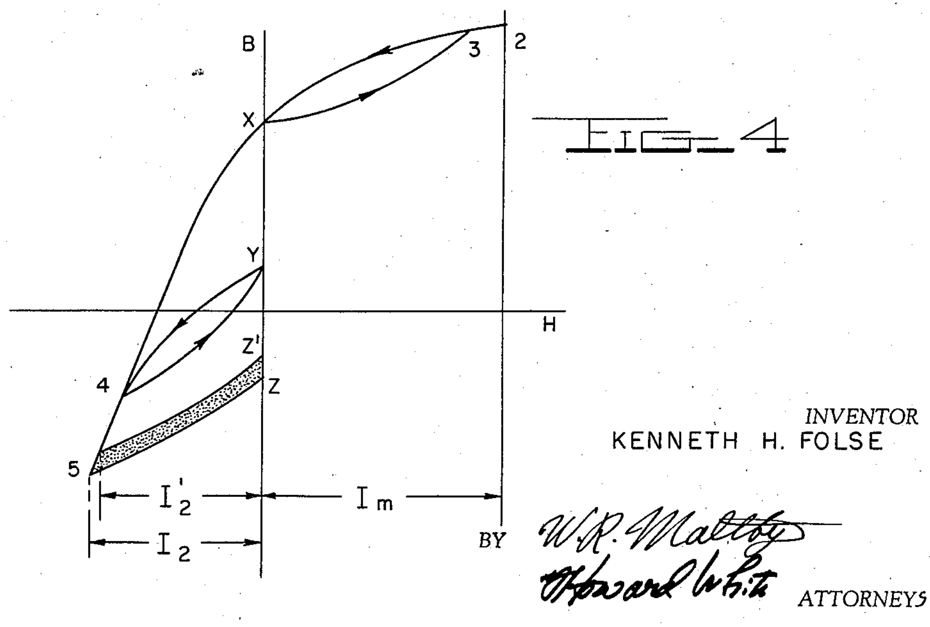
Fig. 4 represents a BH curve of some of the successive hysteresis loops of a point on the drum surface for one cycle of the current.

It is apparent that each point on the surface of the drum will go through a similar although not an identical process; therefore, after aproximately five and a half cycles, all points on the drum will have a residual magnetism of somewhere between *z* and *z'*, Fig. 4, the shaded area indicating the margin of variation between the paths of the various points on the drum. Subsequent cycles of the demagnetizing current act similarly so that the absolute value of the residual induction asymptotically approaches zero and the track of the drum will be erased.

It is evident from the preceding discussion of the erase mechanism that the Q of the circuit, a measure of the rapidity of decay of the exponential waveform, must be high enough so that successive half wave cycles of the erase train are sufficient to change the polarity of the residual magnetism. The value cannot be too high since the wave train would eventually decay anyway. However, excessively high Q would result in an unnecessarily long erasing time.

Obviously many modifications and variations of the present invention are possible in the light of the above teachings. It is therefore to be understood, that within the scope of the appended claims, the invention may be practiced otherwise than as specifically described.

What is claimed is:

1. A magnetic record eraser comprising in combination, a rotatable support having a magnetic record of extended surface thereon and means for erasing said magnetic record on said rotatable member, said means comprising a power source, a magnetic head located in proximity to said rotatable member and forming part of a circuit operative in response to said power source to produce at the magnetic head a damped oscillating magnetic field of progressively diminishing amplitude in which the period of the half cycles is equal to the time required for at least two revolutions of said rotatable member.

2. A magnetic record eraser comprising in combination, a rotatable support having a magnetic record of extended surface thereon and means for erasing said magnetic record on said rotatable member, said means comprising a power source, a magnetic head located in proximity to said rotatable member and forming part of a series circuit which comprises a capacitor, an inductance and means operative to allow charging said capacitor from said power source and subsequent discharging of said capacitor to produce at the magnetic head a damped oscillating magnetic field of progressively diminishing amplitude in which the period of the half cycles is equal to the time required for at least two revolutions of said rotatable member.

3. A device capable of producing a damped oscillating magnetic field of progressively diminishing amplitude and constant frequency which comprises a power source, a circuit having in series a magnetic head, an inductance, a capacitor and switching means, said switching means being connected to said capacitor and adapted to define a closed circuit with said power source to charge said capacitor and alternatively to define a discharge circuit from said capacitor through said inductance and magnetic head to produce at the magnetic head a damped oscillating magnetic field of progressively diminishing amplitude.

References Cited in the file of this patent

UNITED STATES PATENTS

| | | |
|---|---|---|
| 1,828,190 | Kiliani | Oct. 20, 1931 |
| 2,397,497 | Mages | Apr. 2, 1946 |
| 2,535,481 | Begun | Dec. 26, 1950 |
| 2,596,621 | Van Loon et al. | May 13, 1952 |

FOREIGN PATENTS

| | | |
|---|---|---|
| 97,306 | Sweden | Nov. 7, 1939 |